(12) United States Patent
Campbell

(10) Patent No.: US 10,946,956 B2
(45) Date of Patent: Mar. 16, 2021

(54) UNMANNED AERIAL SYSTEMS HAVING OUT OF PHASE GIMBALLING AXES

(71) Applicant: Textron Innovations Inc., Providence, RI (US)

(72) Inventor: Kip Gregory Campbell, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 436 days.

(21) Appl. No.: 16/118,372

(22) Filed: Aug. 30, 2018

(65) Prior Publication Data

US 2020/0070969 A1 Mar. 5, 2020

(51) Int. Cl.

| B64C 29/00 | (2006.01) |
|---|---|
| B64C 27/12 | (2006.01) |
| B64C 27/52 | (2006.01) |
| B64C 27/50 | (2006.01) |
| B64C 3/56 | (2006.01) |
| B64C 39/02 | (2006.01) |

(52) U.S. Cl.
CPC ............ *B64C 29/0033* (2013.01); *B64C 3/56* (2013.01); *B64C 27/12* (2013.01); *B64C 27/50* (2013.01); *B64C 27/52* (2013.01); *B64C 39/024* (2013.01); *B64C 2201/021* (2013.01); *B64C 2201/024* (2013.01); *B64C 2201/042* (2013.01); *B64C 2201/102* (2013.01); *B64C 2201/108* (2013.01); *B64C 2201/141* (2013.01); *B64C 2201/146* (2013.01); *B64C 2201/165* (2013.01)

(58) Field of Classification Search
CPC . B64C 29/0033; B64C 27/024; B64C 27/021; B64C 27/027; B64C 27/52; B64C 2201/024; B64C 27/50
See application file for complete search history.

(56) References Cited

U.S. PATENT DOCUMENTS

| 2,434,276 A | * | 1/1948 | Laskowitz | .............. B64C 27/52 416/121 |
|---|---|---|---|---|
| 6,347,764 B1 | * | 2/2002 | Brandon | .................. F42B 10/58 102/388 |
| 7,789,341 B2 | * | 9/2010 | Arlton | .................... B64C 39/024 244/17.23 |

(Continued)

FOREIGN PATENT DOCUMENTS

CA 2711149 A1 * 7/2009 ............. B64C 27/32

*Primary Examiner* — Christopher P Ellis
(74) *Attorney, Agent, or Firm* — Lawrence Youst PLLC

(57) ABSTRACT

An unmanned aerial system includes an elongated fuselage having first and second rotational degrees of freedom. A forward propulsion assembly is disposed at the forward end of the fuselage. The forward propulsion assembly includes a forward rotor hub assembly rotatably coupled to the fuselage and reversibly tiltable about a first gimballing axis to provide a first moment on the fuselage in the first rotational degree of freedom. An aft propulsion assembly is disposed at the aft end of the fuselage. The aft propulsion assembly includes an aft rotor hub assembly rotatably coupled to the fuselage and reversibly tiltable about a second gimballing axis to provide a second moment on the fuselage in the second rotational degree of freedom. The first gimballing axis is out of phase with the second gimballing axis to control the orientation of the fuselage.

20 Claims, 9 Drawing Sheets

(56) References Cited

U.S. PATENT DOCUMENTS

| | | | | |
|---|---|---|---|---|
| 8,083,173 | B2* | 12/2011 | Arlton | B64C 39/024 |
| | | | | 244/17.23 |
| 8,146,854 | B2* | 4/2012 | Lawrence | B64C 39/024 |
| | | | | 244/17.23 |
| 9,434,471 | B2* | 9/2016 | Arlton | B64C 27/10 |
| 2004/0075017 | A1* | 4/2004 | Sash | B64C 27/52 |
| | | | | 244/10 |
| 2016/0167778 | A1* | 6/2016 | Meringer | B64C 27/006 |
| | | | | 244/17.23 |
| 2017/0297685 | A1* | 10/2017 | Heverly | B64C 27/001 |
| 2017/0320565 | A1* | 11/2017 | Gamble | B64C 39/024 |
| 2018/0002005 | A1* | 1/2018 | Groenewald | B64C 27/32 |
| 2018/0002011 | A1* | 1/2018 | McCullough | B64C 11/28 |
| 2018/0265189 | A1* | 9/2018 | Zhang | B64C 27/20 |
| 2018/0305011 | A1* | 10/2018 | Wright | B64C 29/00 |
| 2019/0023383 | A1* | 1/2019 | Lauder | B64C 27/59 |
| 2019/0047692 | A1* | 2/2019 | Schank | B64C 27/322 |
| 2019/0061936 | A1* | 2/2019 | North | B64C 29/0033 |
| 2019/0300152 | A1* | 10/2019 | Choi | B64C 27/322 |
| 2020/0023964 | A1* | 1/2020 | Valente | B64C 39/024 |
| 2020/0130813 | A1* | 4/2020 | Choi | B64C 11/06 |
| 2020/0346747 | A1* | 11/2020 | Lukaczyk | B64C 29/0033 |

* cited by examiner

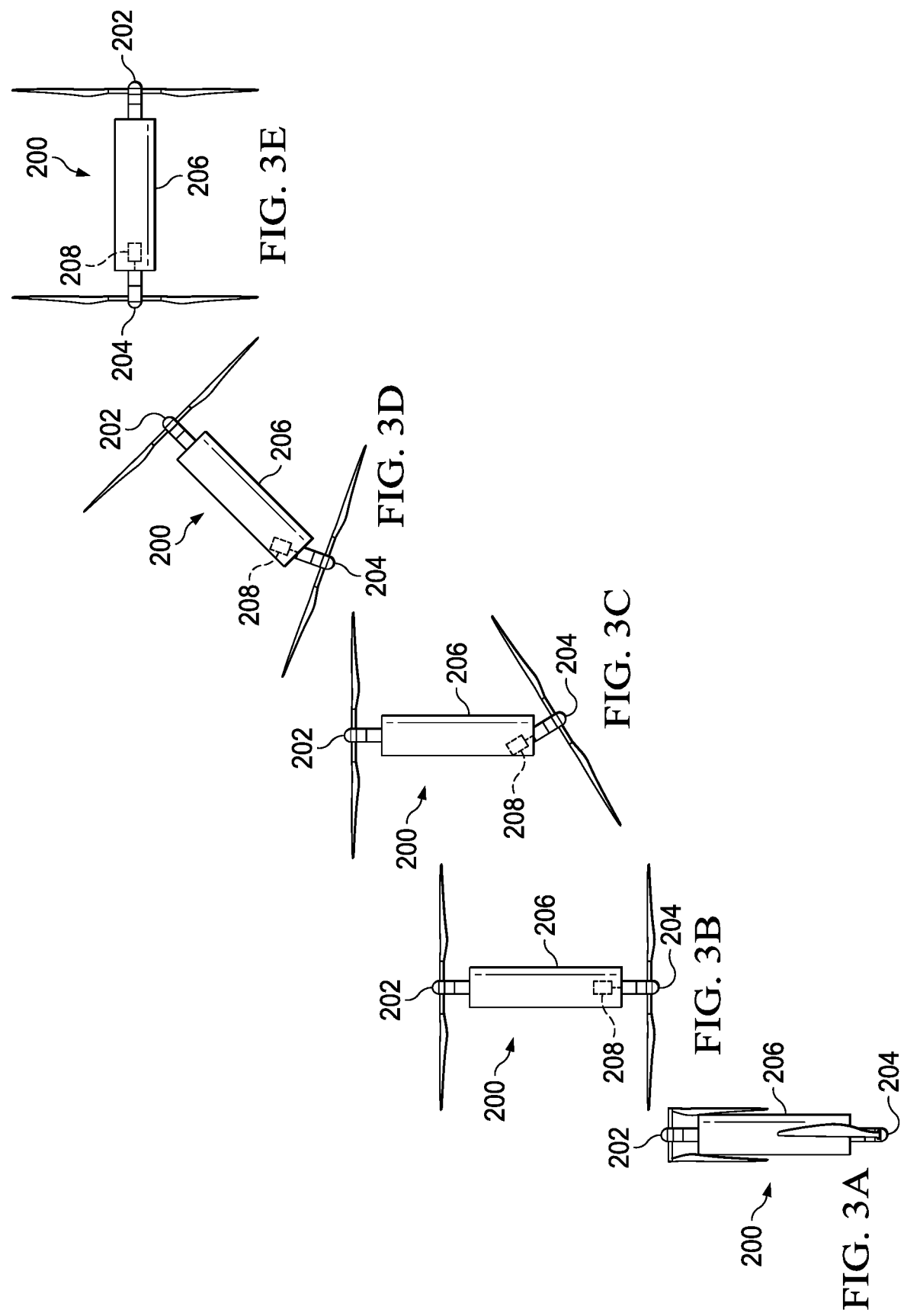

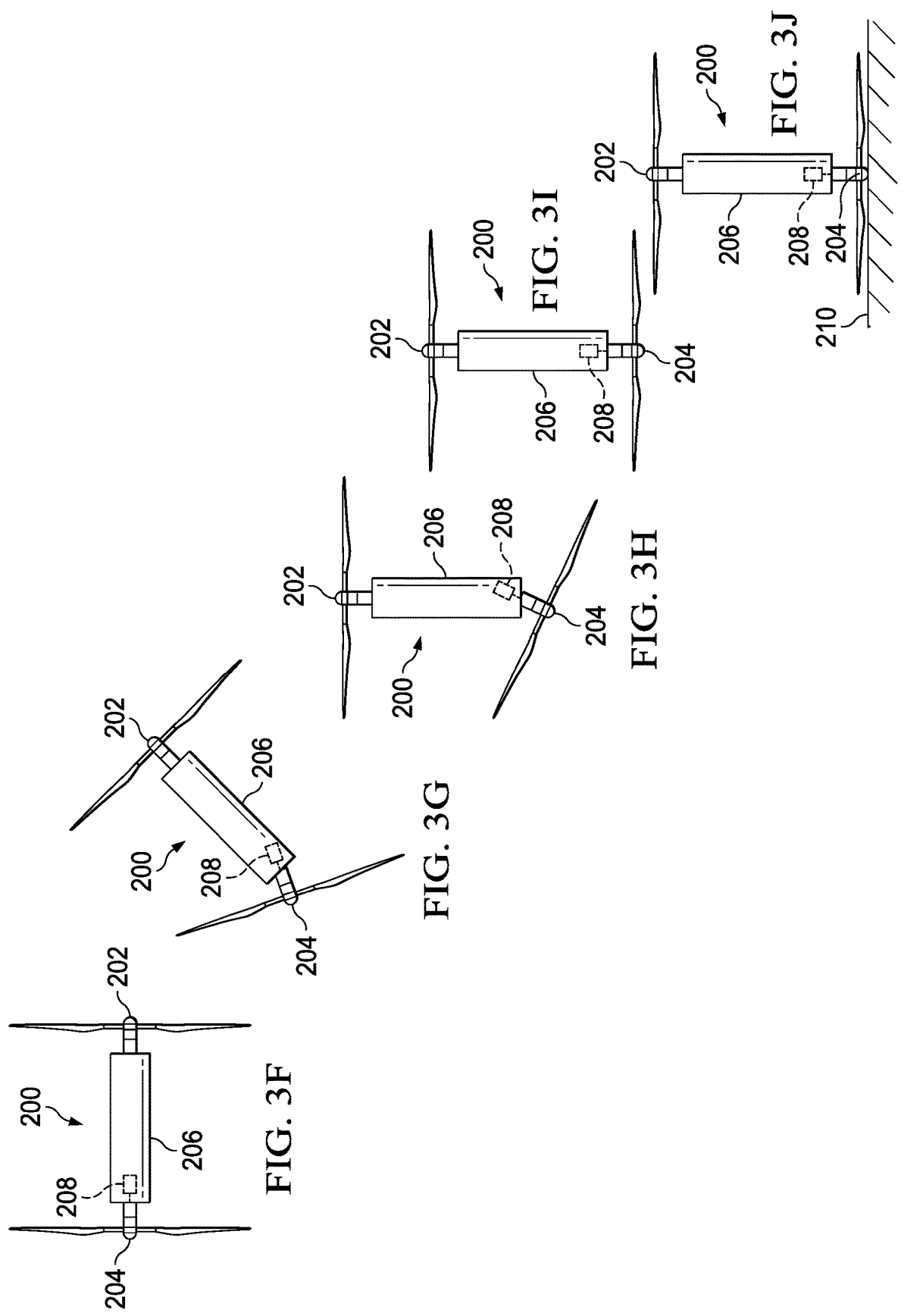

UNMANNED AERIAL SYSTEMS HAVING OUT OF PHASE GIMBALLING AXES

TECHNICAL FIELD OF THE DISCLOSURE

The present disclosure relates, in general, to rotorcraft having out of phase gimballing axes and, in particular, to unmanned aerial systems including a fuselage and opposable rotor hub assemblies having out of phase gimballing axes to transition between flight modes and/or orient the fuselage.

BACKGROUND

Fixed-wing aircraft, such as airplanes, are capable of flight using wings that generate lift responsive to the forward airspeed of the aircraft, which is generated by forward thrust from one or more jet engines or propellers. The wings have an airfoil cross section that deflects air downwardly as the aircraft moves forward, generating vertical lift to support the airplane in flight. Unmanned aerial systems may be configured as fixed-wing aircraft. Unlike fixed-wing aircraft, vertical takeoff and landing (VTOL) aircraft do not require runways. Instead, VTOL aircraft are capable of taking off, hovering and landing vertically. One example of VTOL aircraft is a helicopter, whose main rotor not only enables hovering, vertical takeoff and vertical landing, but also enables forward, aftward and lateral flight. Unmanned aerial systems may also be configured as helicopters or other types of VTOL aircraft.

Current fixed-wing and VTOL unmanned aerial systems often require heavy, cumbersome or redundant systems to maintain their orientations in flight. Also, while attempts have been made toward developing unmanned aerial systems that combine the vertical lift capability of a VTOL aircraft with the speed and range of fixed-wing aircraft, such unmanned aerial systems are often complex and cannot be scaled down to small or personal-sized unmanned aerial systems, such as personal drones that can be conveniently carried by military personnel. For example, current fixed-wing and VTOL unmanned aerial systems may be unsuitably structured for compact storage when not in use or while being transported. Accordingly, a need has arisen for an unmanned aerial system with the adaptability to operate as either or both a fixed-wing aircraft or VTOL aircraft while being capable of simple operation and/or convenient storage.

SUMMARY

In a first aspect, the present disclosure is directed to an unmanned aerial system including an elongated fuselage having forward and aft ends and first and second rotational degrees of freedom and a forward propulsion assembly disposed at the forward end of the fuselage. The forward propulsion assembly includes a forward rotor hub assembly rotatably coupled to the fuselage and reversibly tiltable about a first gimballing axis to provide a first moment on the fuselage in the first rotational degree of freedom. The unmanned aerial system includes an aft propulsion assembly disposed at the aft end of the fuselage. The aft propulsion assembly includes an aft rotor hub assembly rotatably coupled to the fuselage and reversibly tiltable about a second gimballing axis to provide a second moment on the fuselage in the second rotational degree of freedom. The first gimballing axis is out of phase with the second gimballing axis to control the orientation of the fuselage in the first and second rotational degrees of freedom.

In some embodiments, the unmanned aerial system may be operable to transition between a vertical takeoff and landing flight mode and a forward flight mode. In such embodiments, the fuselage may have a substantially vertical orientation in the vertical takeoff and landing flight mode and a substantially horizontal orientation in the forward flight mode. In certain embodiments, in the vertical takeoff and landing flight mode the first rotational degree of freedom may be one of a pitch or lateral rotational degree of freedom and the second rotational degree of freedom may be the other of the pitch or lateral rotational degree of freedom. In some embodiments, in the vertical takeoff and landing flight mode differential torque between the forward and aft rotor hub assemblies may provide a third moment on the fuselage in a yaw rotational degree of freedom. In certain embodiments, in the forward flight mode the first rotational degree of freedom may be one of a pitch or yaw rotational degree of freedom and the second rotational degree of freedom may be the other of the pitch or yaw rotational degree of freedom. In some embodiments, in the forward flight mode differential torque between the forward and aft rotor hub assemblies may provide a third moment on the fuselage in a lateral rotational degree of freedom. In certain embodiments, the fuselage may be a cylindrical fuselage or may have a polygonal cross sectional shape. In some embodiments, the forward propulsion assembly may include an actuator operable to rotate the forward rotor hub assembly about the first gimballing axis and the aft propulsion assembly may include an actuator operable to rotate the aft rotor hub assembly about the second gimballing axis. In certain embodiments, differential torque between the forward and aft rotor hub assemblies may provide a third moment on the fuselage in a third rotational degree of freedom.

In some embodiments, the forward and aft rotor hub assemblies may be counter rotating. In certain embodiments, the forward and aft rotor hub assemblies may be rotatable to provide thrust in the same direction. In some embodiments, the forward and aft rotor hub assemblies may be variable speed forward and aft rotor hub assemblies. In certain embodiments, the forward and aft rotor hub assemblies may include fixed pitch rotor blades. In some embodiments, the forward and aft rotor hub assemblies may include foldable rotor blades folded toward the fuselage in a storage mode. In certain embodiments, the forward and aft rotor hub assemblies may rotate about a common axis when the forward and aft rotor hub assemblies are in a nongimballed position. In some embodiments, the first gimballing axis may be orthogonal to the second gimballing axis. In certain embodiments, the unmanned aerial system may include a power system including a battery housed in the fuselage. In some embodiments, the unmanned aerial system may include one or more wings extending radially from the fuselage. In certain embodiments, the wing(s) may be retractable toward the fuselage in a storage mode. In some embodiments, the wing(s) may be detachable from the fuselage in a storage mode.

In a second aspect, the present disclosure is directed to a rotorcraft including an elongated fuselage having forward and aft ends and first and second rotational degrees of freedom. The fuselage has a substantially vertical orientation in a vertical takeoff and landing flight mode and a substantially horizontal orientation in a forward flight mode. The rotorcraft includes a forward propulsion assembly disposed at the forward end of the fuselage. The forward propulsion assembly includes a forward rotor hub assembly rotatably coupled to the fuselage and reversibly tiltable about a first gimballing axis to provide a first moment on the fuselage in the first rotational degree of freedom. The rotorcraft includes an aft propulsion assembly disposed at the aft end of the fuselage. The aft propulsion assembly includes an aft rotor hub assembly rotatably coupled to the fuselage and reversibly tiltable about a second gimballing axis to provide a second moment on the fuselage in the second rotational degree of freedom. The first gimballing axis is orthogonal to the second gimballing axis to control the orientation of the fuselage in the first and second rotational degrees of freedom. In the vertical takeoff and landing flight mode, the first rotational degree of freedom is one of a pitch or a roll rotational degree of freedom and the second rotational degree of freedom is the other of the pitch or the roll rotational degree of freedom. In the forward flight mode, the first rotational degree of freedom is one of the pitch or a yaw rotational degree of freedom and the second rotational degree of freedom is the other of the pitch or the yaw rotational degree of freedom.

In some embodiments, in the forward flight mode the first rotational degree of freedom may be a yaw rotational degree of freedom and the second rotational degree of freedom may be a pitch rotational degree of freedom. In certain embodiments, the forward rotor hub assembly may include a first plurality of rotor blades and the aft rotor hub assembly may include a second plurality of rotor blades having the same length as the first plurality of rotor blades. In some embodiments, either or both the forward or aft rotor hub assemblies may be tiltable to transition the fuselage between the vertical orientation and the horizontal orientation. In certain embodiments, the forward propulsion assembly may include an electric motor operable to gimbal about the first gimballing axis and the aft propulsion assembly may include an electric motor operable to gimbal about the second gimballing axis.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3J are schematic illustrations of an unmanned aerial system in a sequential takeoff, flight and landing operation scenario in accordance with embodiments of the present disclosure;

DETAILED DESCRIPTION

Figure 1A:
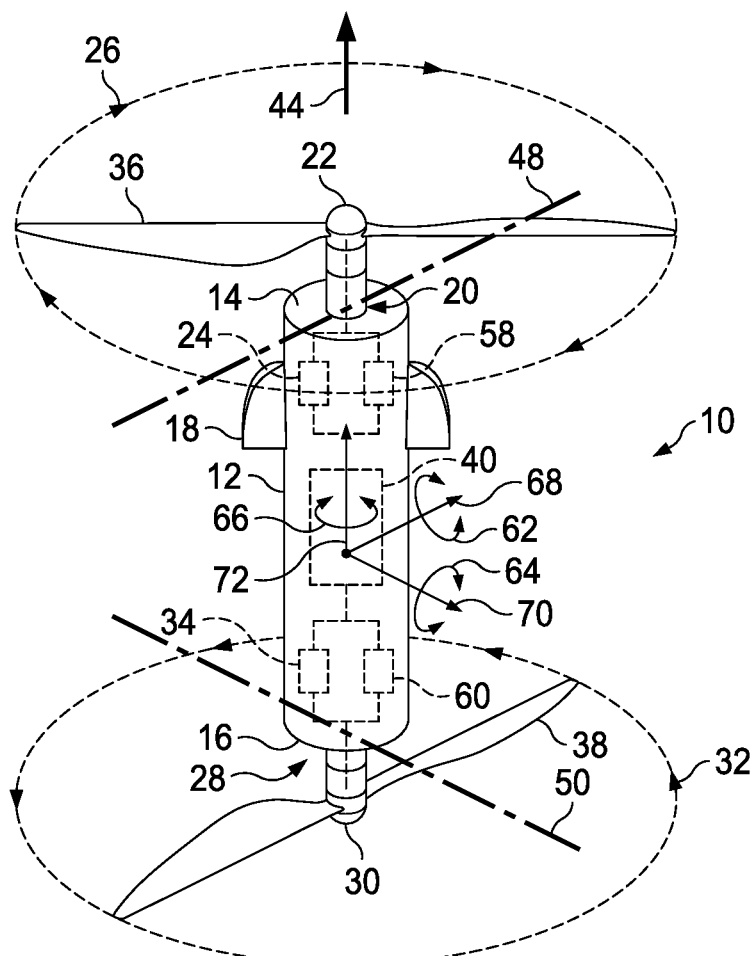
FIGS. 1A-1E are schematic illustrations of an unmanned aerial system having out of phase gimballing axes in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1E in the drawings, an unmanned aerial system is schematically illustrated and generally designated 10. Unmanned aerial system 10 includes an elongated fuselage 12 having a forward end 14 and an aft end 16. Fuselage 12 is cylindrical and has a circular cross-section, although in other embodiments fuselage 12 may form other shapes and have a polygonal, elliptical, irregular or other cross-sectional shape. Winglets 18 extend radially outward from fuselage 12. A forward propulsion assembly 20 is disposed at forward end 14 of fuselage 12. Forward propulsion assembly 20 includes a forward rotor hub assembly 22 rotatably coupled to fuselage 12. An electric motor 24 provides rotational energy for forward rotor hub assembly 22 to rotate in direction 26. Similarly, an aft propulsion assembly 28 includes an aft rotor hub assembly 30 rotatably coupled to fuselage 12 and rotatable in direction 32 in response to rotational energy provided by electric motor 34. Forward and aft rotor hub assemblies 22, 30 each include two rotor blades 36, 38, respectively, although in other embodiments forward and aft rotor hub assemblies 22, 30 could alternatively have a different number of rotor blades. Rotor blades 36 are the same length as rotor blades 38. Rotor blades 36, 38 are counter rotating, as indicated by opposing directions 26 and 32. While rotor blades 36, 38 are illustrated as fixed pitch rotor blades, either or both sets of rotor blades 36, 38 may be variable pitch rotor blades operably connected to a swash plate and having collective and/or cyclic control. Forward and aft rotor hub assemblies 22, 30 are variable speed rotor hub assemblies. The torque and revolutions per minute (RPM) of forward rotor hub assembly 22 are independently controllable from the torque and RPM of aft rotor hub assembly 30, thereby allowing rotor hub assemblies 22, 30 to have the same or different torque, RPM or resulting thrust. For example, forward rotor hub assembly 22 may spin faster than aft rotor hub assembly 30 and therefore produce more thrust than aft rotor hub assembly 30. Fuselage 12 houses a power system 40, such as a battery, to provide power to electric motors 24, 34 as well as other systems and components of unmanned aerial system 10. Unmanned aerial system 10 may be any size or weight based on many factors, such as desired payload or intended functionality.

Figure 1B:
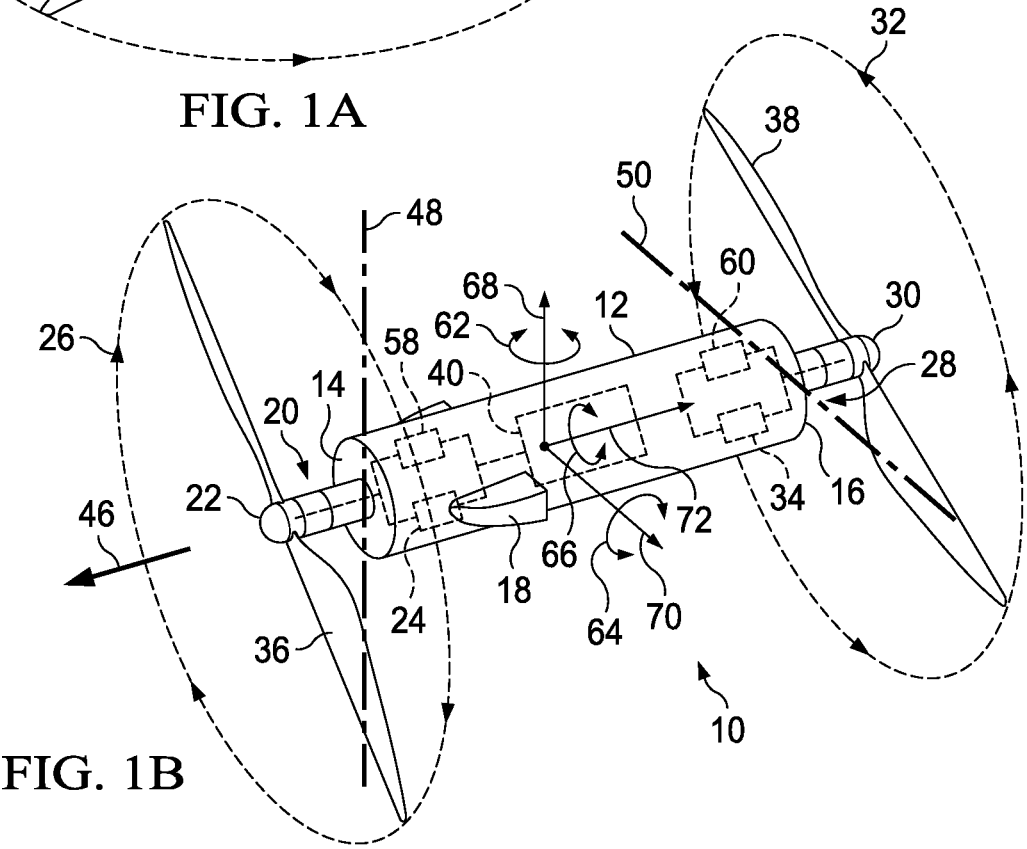

FIG. 1A illustrates unmanned aerial system 10 in a vertical takeoff and landing (VTOL) flight mode, in which rotor hub assemblies 22, 30 are each positioned to rotate in a generally horizontal plane to provide a lifting thrust such that unmanned aerial system 10 flies much like a conventional helicopter. Fuselage 12 has a vertical orientation in VTOL flight mode. FIG. 1B illustrates unmanned aerial system 10 in a forward flight mode, in which rotor hub assemblies 22, 30 are each positioned to rotate in a substantially vertical plane to provide a generally forward thrust similar to a conventional propeller driven aircraft. Fuselage 12 has a horizontal orientation in forward flight mode, and in some embodiments a lifting force may be supplied by winglets 18 or larger wings. While in the illustrated embodiment unmanned aerial system 10 transitions between VTOL flight mode in FIG. 1A and forward flight mode in FIG. 1B, in other embodiments unmanned aerial system 10 may be operable in only one or the other flight mode.

Figure 1C:
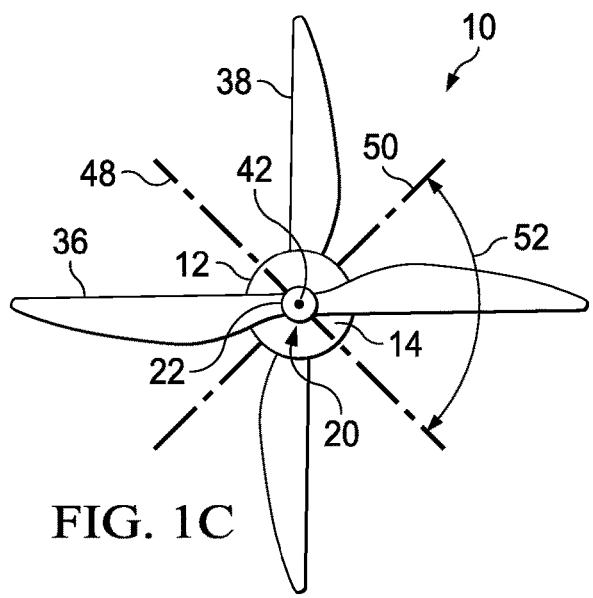
Figure 1D:
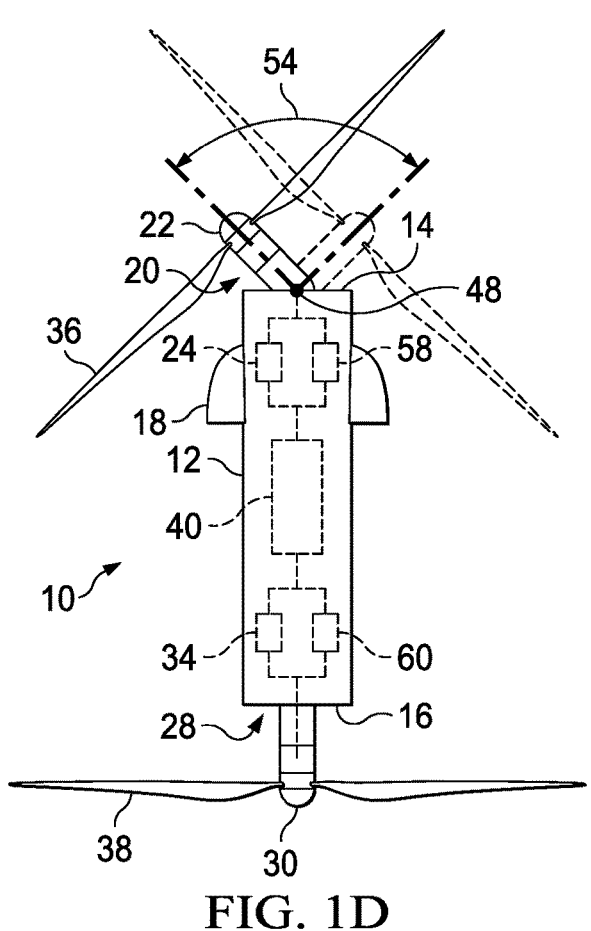
Figure 1E:
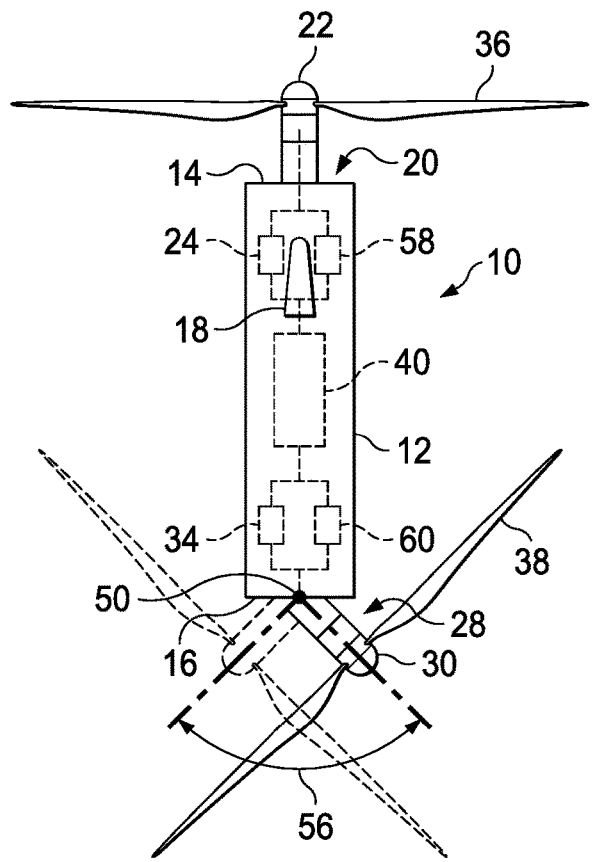

In FIGS. 1A-1C, forward and aft rotor hub assemblies 22, 30 are in a nongimballed position and coaxially rotate about a common axis 42 that extend into and out of the page in FIG. 1C. In this nongimballed position, forward and aft rotor hub assemblies 22, 30 both produce thrust in the same direction, such as a vertical thrust 44 in VTOL flight mode and a forward thrust 46 in forward flight mode. Forward rotor hub assembly 22 is reversibly tiltable about gimballing axis 48. Aft rotor hub assembly 30 is reversibly tiltable about gimballing axis 50, which is out of phase with gimballing axis 48. As best seen in FIG. 1C, gimballing axis 48 is orthogonal to gimballing axis 50. Gimballing axis 48 may, however, form any out of phase angle 52 with gimballing axis 50. As best seen in FIGS. 1D and 1E, forward and aft rotor hub assemblies 22, 30 each have an angular range of motion 54, 56 about their respective gimballing axes 48, 50. Angular ranges of motion 54, 56 may be narrow, wide or any other angle depending on the embodiment. Actuator 58 of forward propulsion assembly 20 rotates, or tilts, forward rotor hub assembly 22 about gimballing axis 48 and an actuator 60 of aft propulsion assembly 28 rotates, or tilts, aft rotor hub assembly 30 about gimballing axis 50. Actuators 58, 60 are powered by power system 40. In some embodiments, actuators 58, 60 may also tilt electric motors 24, 34 about gimballing axes 48, 50, respectively. For example, actuator 58 may tilt forward rotor hub assembly 22 and electric motor 24 in synchrony about gimballing axis 48 and actuator 60 may tilt aft rotor hub assembly 30 and electric motor 34 in synchrony about gimballing axis 50. In other embodiments, electric motors 24, 34 may be substantially stationary relative to rotor hub assemblies 22, 30 and a portion of the drive shaft or mast connecting rotor hub assemblies 22, 32 to electric motors 24, 34 may be actuated and gimballed by actuators 58, 60, respectively.

Tilting forward and aft rotor hub assemblies 22, 30 about out of phase gimballing axes 48, 50 generates moments on fuselage 12 that provide unmanned aerial system 10 with the ability to control the orientation of fuselage 12 and transition between the vertical orientation of VTOL flight mode and the horizontal orientation of forward flight mode. As best seen in FIGS. 1A and 1B, unmanned aerial system 10 has three rotational degrees of freedom 62, 64, 66 that may be independently controlled to manage the orientation of unmanned aerial system 10. Forward rotor hub assembly 22 is reversibly tiltable about gimballing axis 48 to provide a moment on fuselage 12 in rotational degree of freedom 62 about axis 68. Aft rotor hub assembly 30 is reversibly tiltable about gimballing axis 50 to provide a moment on fuselage 12 in rotational degree of freedom 64 about axis 70. Differential torque between forward and aft rotor hub assemblies 22, 30 provide another moment on fuselage 12 in rotational degree of freedom 66 about axis 72. The differential torque between forward and aft rotor hub assemblies 22, 30, and therefore the torque about axis 72, may be controlled by differing the RPMs of forward and aft rotor hub assemblies 22, 30. In embodiments in which rotor blades 36, 38 are variable pitch rotor blades, the differential torque between forward and aft rotor hub assemblies 22, 30 may be controlled by differing the collective pitch of rotor blades 36 relative to the collective pitch of rotor blades 38, or vice versa.

When unmanned aerial system 10 is in VTOL flight mode as shown in FIG. 1A, rotational degrees of freedom 62, 64 are pitch and roll rotational degrees of freedom, or vice versa, depending upon the direction of horizontal motion of unmanned aerial system 10. Pitch and roll rotational degrees of freedom 62, 64 are controlled by the gimballing action of forward and aft rotor hub assemblies 22, 30 about gimballing axes 48, 50, respectively. Also in VTOL flight mode, rotational degree of freedom 66 is a yaw rotational degree of freedom controlled by the differential torque between forward and aft rotor hub assemblies 22, 30. When unmanned aerial system 10 is in forward flight mode as shown in FIG. 1B, rotational degree of freedom 62 is a yaw rotational degree of freedom controlled by gimballing forward rotor hub assembly 22 about gimballing axis 48 and rotational degree of freedom 64 is a pitch rotational degree of freedom controlled by gimballing aft rotor hub assembly 30 about gimballing axis 50. In other embodiments, gimballing axes 48 and 50 may be reversed such that gimballing forward rotor hub assembly controls pitch rotational degree of freedom 64 and gimballing aft rotor hub assembly 30 controls yaw rotational degree of freedom 62. Differential torque between forward and aft rotor hub assemblies 22, 30 controls a roll rotational degree of freedom 66 in forward flight mode.

The illustrative embodiments of unmanned aerial system 10 allow for full three axis control using single axis gimballing actuation for each rotor hub assembly 22, 30 and differential motor torque between electric motors 24, 34. Implementing three axis control in this manner simplifies the spatial control of unmanned aerial system 10, allowing unmanned aerial system 10 to be used in a broad number of VTOL or conventional unmanned aerial system applications. For example, unmanned aerial system 10 may be used in a wide variety of military missions including data collection, imaging, reconnaissance, weapon deployment or other missions. By way of non-limiting example, unmanned aerial system 10 may be used to deploy a grenade or other explosive in a hard-to-reach area, such as a cave or inside a building. Unmanned aerial system 10 may also be scalable to any size from miniature drone implementations to piloted implementations. For example, unmanned aerial system 10 may be implemented as a micro unmanned aerial system, mini VTOL vehicle or hobbyist aircraft for recreational use. In other embodiments, unmanned aerial system 10 may be one of a multitude of deployable swarm unmanned aerial systems capable of intercommunication and coordinated missions. Unmanned aerial system 10 may be easily storable and deployable for ease of transport when not in use. While unmanned aerial system 10 is illustrated as including winglets 18, in other embodiments unmanned aerial system 10 may exclude winglets 18 or include other wing types.

It should be appreciated that unmanned aerial system 10 is merely illustrative of a variety of aircraft that can implement the embodiments disclosed herein. Indeed, out of phase gimballing axes 48 and 50 may be utilized on any rotorcraft. Other aircraft implementations can include tiltrotor aircraft, hybrid aircraft, compound aircraft, tiltwing aircraft, quad tiltrotor aircraft, helicopters, propeller airplanes, manned or piloted aircraft and the like. As such, those skilled in the art will recognize that out of phase gimballing axes 48 and 50 disclosed herein can be integrated into a variety of aircraft configurations. It should be appreciated that even though aircraft are particularly well-suited to implement the embodiments of the present disclosure, non-aircraft vehicles and devices can also implement the embodiments.

Figure 2:
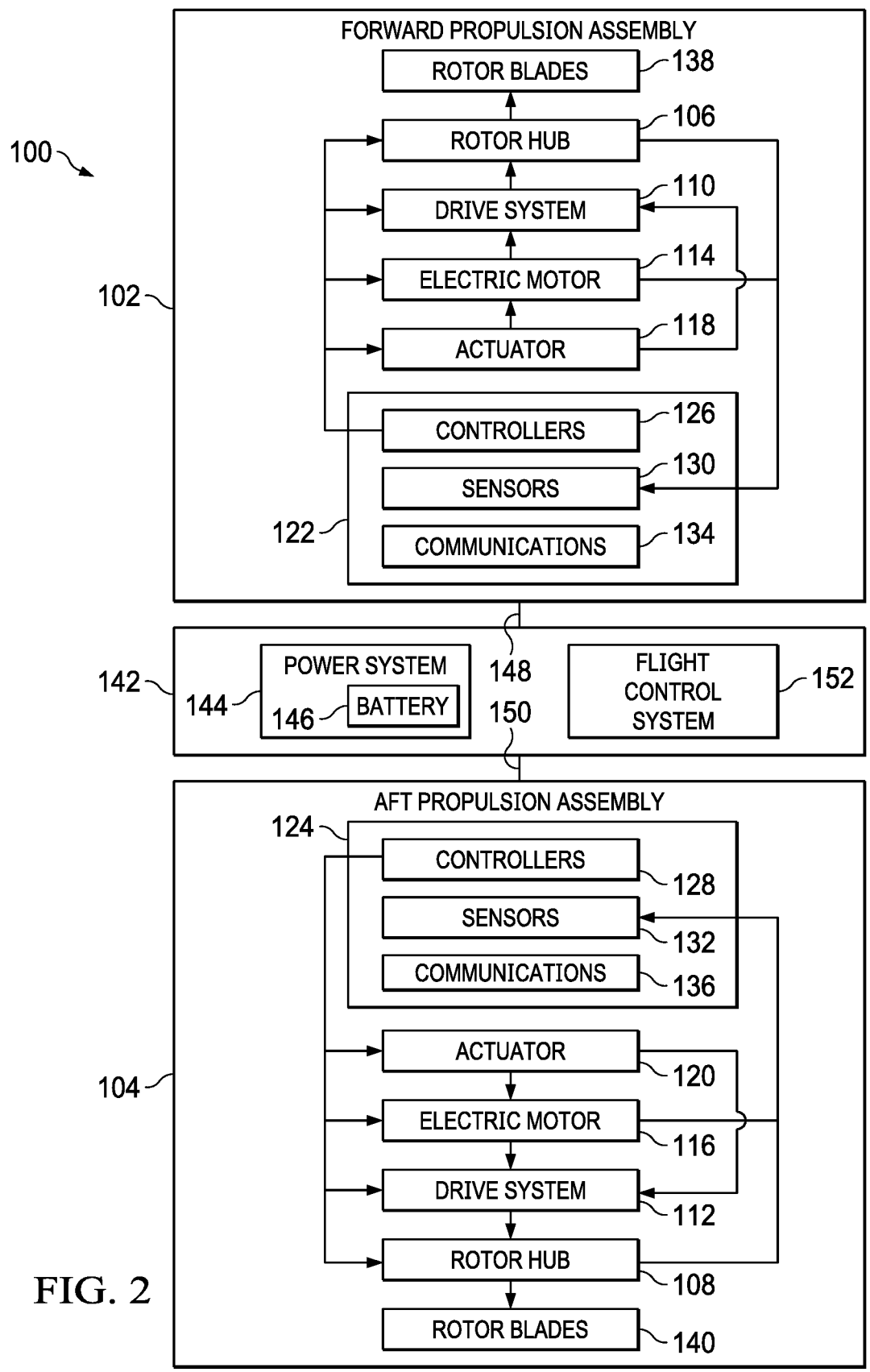
FIG. 2 is a block diagram of a propulsion and control system for an unmanned aerial system having out of phase gimballing axes in accordance with embodiments of the present disclosure.

Referring to FIG. 2 in the drawings, a propulsion and control system for an unmanned aerial system is schematically illustrated and generally designated 100. Forward and aft propulsion assemblies 102, 104 each include a rotor hub 106, 108, a drive system 110, 112, an electric motor 114, 116, an actuator 118, 120 and an electronics node 122, 124 including, for example, controllers 126, 128, sensors 130, 132 and communications elements 134, 136, respectively, as well as other components suitable for use in the operation of propulsion assemblies 102, 104. Each rotor hub 106, 108 includes a plurality of rotor blades 138, 140, respectively, radiating therefrom. Rotor blades 138, 140 may be fixed or variable pitch rotor blades. In addition, each propulsion assembly 102, 104 may be operable for independent thrust vectoring about respective gimballing axes that are out of phase with one another.

Fuselage 142 includes power system 144 that may serve as the electrical energy source for propulsion assemblies 102, 104, including electric motors 114, 116, actuators 118, 120 and electronics nodes 122, 124. Power system 144 may include one or more batteries 146. Battery 146 may be charged by an electrical energy generation system (not shown), such as an internal combustion engine, or may be charged at a ground station. Battery 146 may also be interchangeably removed and installed to enable efficient refueling which may be particularly beneficial in embodiments of unmanned aerial system 100 wherein the sole electrical energy source is battery 146. In embodiments that include an electrical energy generation system, such as an internal combustion engine, housed within fuselage 142, the electrical energy generation system may include one or more fuel tanks, such as liquid fuel tanks. In one non-limiting example, an internal combustion engine may be used to drive an electric generator that produces electrical energy that is fed to propulsion assemblies 102, 104 via communication lines 148, 150 to power electric motors 114, 116, actuators 118, 120 and/or electronics nodes 122, 124. In other embodiments, unmanned aerial system 100 may implement a hybrid power system including both an internal combustion engine and batteries. This type of hybrid power system may be beneficial in that the energy density of liquid fuel exceeds that of batteries enabling greater endurance for unmanned aerial system 100. In the hybrid power system, battery 146 may provide a backup electrical power source to enable unmanned aerial system 100 to safely land in the event of a failure of the internal combustion engine. In yet other embodiments, each propulsion assembly 102, 104 may include a respective battery to provide backup battery power in the event of a failure of power system 144. As another alternative, propulsion assemblies 102, 104 may include hydraulic motors operated within a common hydraulic fluid system wherein one or more high pressure hydraulic sources or generators are housed within fuselage 142 to provide power to each of the hydraulic motors.

In the illustrated embodiment, unmanned aerial system 100 includes a flight control system 152 housed within fuselage 142. Flight control system 152, such as a digital flight control system, is preferably a redundant flight control system and more preferably a triply redundant flight control system including three independent flight control computers. Use of triply redundant flight control system 152 improves the overall safety and reliability of unmanned aerial system 100 in the event of a failure of flight control system 152. Flight control system 152 preferably includes non-transitory computer readable storage media including a set of computer instructions executable by one or more processors for controlling the operation of propulsion assemblies 102, 104. Flight control system 152 may be implemented on one or more general purpose computers, special purpose computers or other machines with memory or processing capability. For example, flight control system 152 may include one or more memory storage modules including, but not limited to, internal storage memory such as random access memory, non-volatile memory such as read only memory, removable memory such as magnetic storage memory, optical storage, solid-state storage memory or other suitable memory storage entity. Flight control system 152 may be a microprocessor-based system operable to execute program code in the form of machine executable instructions. In addition, flight control system 152 may be selectively connectable to other computer systems via a proprietary encrypted network, a public encrypted network, the Internet or other suitable communication network that may include both wired and wireless connections.

Flight control system 152 communicates via a wired and/or wireless communications network with electronics nodes 122, 124 of each propulsion assembly 102, 104. In some embodiments, electronics nodes 122, 124 may instead be combined and centralized into fuselage 142. Flight control system 152 receives sensor data from and sends flight command information to electronics nodes 122, 124 such that each propulsion assembly 102, 104 may be individually and independently controlled and operated. In alternative embodiments, unmanned aerial system 100 may instead be a manned or piloted vehicle. In both manned and unmanned missions, flight control system 152 may autonomously control some or all aspects of flight operation. Flight control system 152 may also be operable to communicate with one or more remote systems via a wireless communications protocol. The remote systems may be operable to receive flight data from and provide commands to flight control system 152 to enable flight control over some or all aspects of flight operation on manned or unmanned missions. Transitions between VTOL flight mode and forward flight mode may be accomplished responsive to remote flight control, autonomous flight control, onboard pilot flight control or combinations thereof.

Referring to FIGS. 3A-3J in the drawings, a sequential takeoff, flight and landing scenario of unmanned aerial system 200 is depicted. Unmanned aerial system 200 includes forward and aft rotor hub assemblies 202, 204 having out of phase gimballing axes. In FIG. 3A, unmanned aerial system 200 is in a storage mode prior to deployment. The rotor blades of forward and aft rotor hub assemblies 202, 204 are folded toward fuselage 206 for a more compact storage footprint. In storage mode, unmanned aerial system 200 may be more easily stored during transport or in tight spaces. For example, unmanned aerial system 200 may be stored and subsequently launched from a munitions dispenser in a military engagement. Unmanned aerial system 200 may also be tossed into the air by a machine or person, after which rotor hub assemblies 202, 204 begin to rotate, causing their respective rotor blades to expand into the radially extending positions shown in FIG. 3B. In FIG. 3B, unmanned aerial system 200 is in VTOL flight mode and fuselage 206 is in a vertical position. Rotor hub assemblies 202, 204 are in their nongimballed positions to provide an upward thrust to lift unmanned aerial system 200. However, forward and aft rotor hub assemblies 202, 204 may be gimballed as necessary to maintain lift and the vertical orientation of fuselage 206. In FIGS. 3C and 3D, aft rotor hub assembly 204 is gimballed about its gimballing axis to cause unmanned aerial system 200 to transition from VTOL flight mode to forward flight mode. In other embodiments, the transition from VTOL flight mode to forward flight mode may be performed by gimballing forward rotor hub assembly 202 and/or managing the torque of each rotor hub assembly 202, 204. Motor 208 swivels along with aft rotor hub assembly 204 about the aft gimballing axis of unmanned aerial system 200, although in other embodiments motor 208 may remain substantially stationary within fuselage 206. In FIGS. 3E and 3F, unmanned aerial system 200 is in forward flight mode and fuselage 206 has a horizontal orientation. Forward and aft rotor hub assemblies 202, 204 may be gimballed as necessary to maintain forward flight and the horizontal orientation of fuselage 206. To land unmanned aerial system 200, aft rotor hub assembly 204 and motor 208 may again gimbal about their gimballing axis to transition unmanned aerial system 200 back into VTOL flight mode as shown in FIGS. 3G and 3H. In other embodiments, unmanned aerial system 200 may omit transitioning into VTOL flight mode and instead land while in forward flight mode. In the illustrated embodiment, once unmanned aerial system 200 transitions into VTOL flight mode, as shown in FIG. 3I, unmanned aerial system 200 may land on a surface 210, as shown in FIG. 3J. In alternate embodiments, unmanned aerial system 200 may be operable only in VTOL flight mode as shown in FIGS. 3A, 3B, 3I and 3J.

Figure 4:
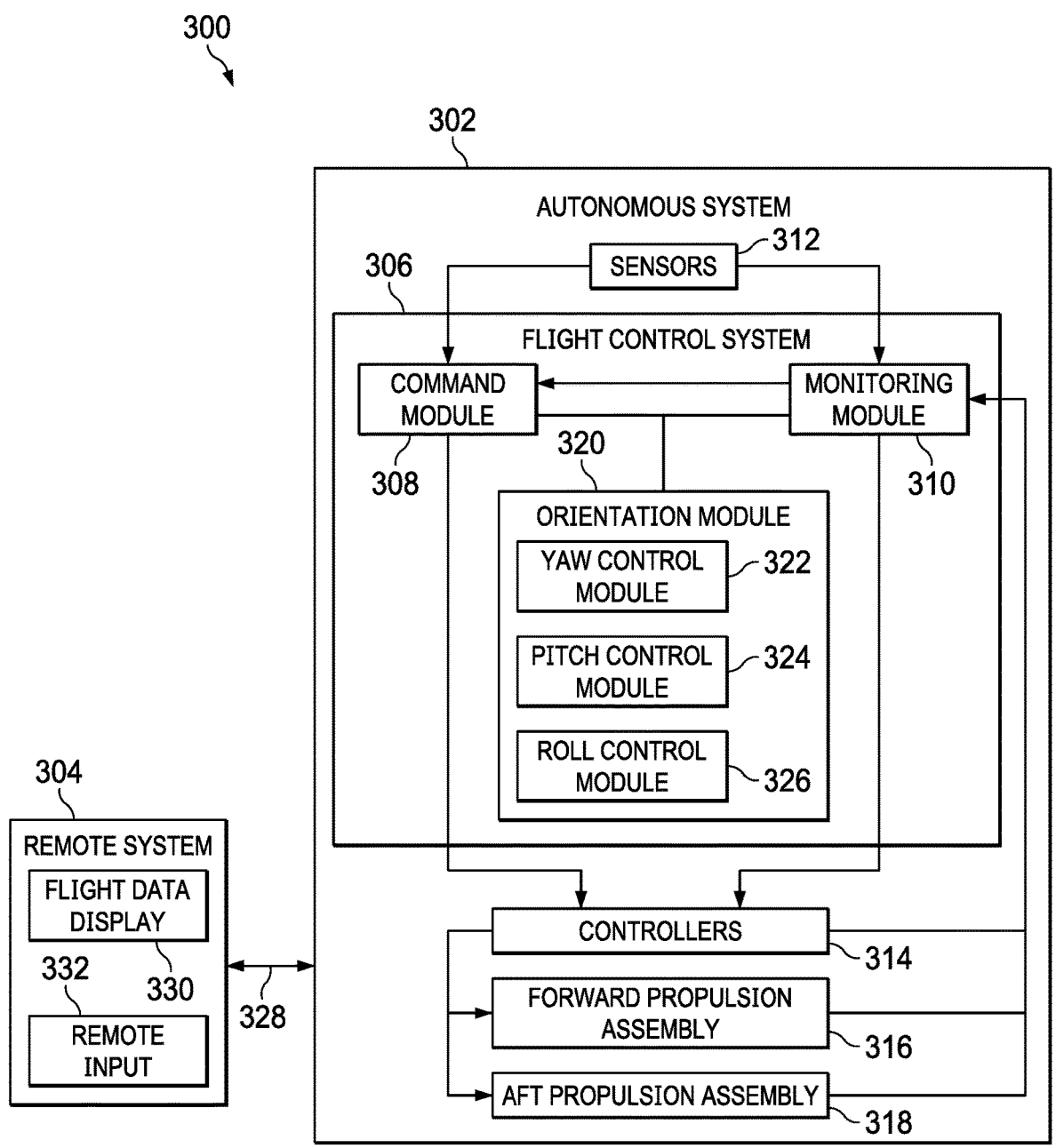
FIG. 4 is a block diagram of a control system for an unmanned aerial system having out of phase gimballing axes in accordance with embodiments of the present disclosure.

Referring to FIG. 4 in the drawings, a block diagram depicts a control system 300 operable for use with an unmanned aerial system, such as unmanned aerial system 10, of the present disclosure. In the illustrated embodiment, control system 300 includes two primary computer-based subsystems, namely, an autonomous system 302 and a remote system 304. As discussed herein, the unmanned aerial system of the present disclosure may be operated autonomously responsive to commands generated by flight control system 306 that preferably includes a non-transitory computer readable storage medium including a set of computer instructions executable by a processor. Flight control system 306 may be a triply redundant system implemented on one or more general purpose computers, special purpose computers or other machines with memory and processing capability. For example, flight control system 306 may include one or more memory storage modules including, but not limited to, internal storage memory such as random access memory, non-volatile memory such as read only memory, removable memory such as magnetic storage memory, optical storage, solid-state storage memory or other suitable memory storage entity. Flight control system 306 may be a microprocessor-based system operable to execute program code in the form of machine executable instructions. In addition, flight control system 306 may be selectively connectable to other computer systems via a proprietary encrypted network, a public encrypted network, the Internet or other suitable communication network that may include both wired and wireless connections.

In the illustrated embodiment, flight control system 306 includes a command module 308 and a monitoring module 310. It is to be understood by those skilled in the art that these and other modules executed by flight control system 306 may be implemented in a variety of forms including hardware, software, firmware, special purpose processors and combinations thereof. Flight control system 306 receives input from a variety of sources including internal sources such as sensors 312, controllers 314, forward and aft propulsion assemblies 316, 318 and orientation module 320 as well as external sources such as remote system 304, global positioning system satellites or other location positioning systems and the like. For example, flight control system 306 may receive a flight plan including starting and ending locations for a mission from remote system 304. Thereafter, flight control system 306 is operable to autonomously control all aspects of flight of the unmanned aerial system. Indeed, autonomous system 302 is capable of performing any programmed mission. Orientation module 320 includes yaw control module 322, pitch control module 324 and roll control module 326 to control the orientation of the unmanned aerial system using out of phase gimballing axes and differential torque as described above.

In one example, during the various operating modes of the unmanned aerial system including VTOL flight mode, forward flight mode and transitions therebetween, command module 308 provides commands to controllers 314. These commands enable independent operation of each propulsion assembly 316, 318 including, for example, controlling the rotational speed of the rotors, changing the pitch of the rotor blades, adjusting the thrust vectors, gimballing the rotor hub assemblies about their respective gimballing axes and the like. In addition, these commands enable transition of the unmanned aerial system between a vertical lift orientation and a forward thrust orientation. Flight control system 306 receives feedback from controllers 314 and each propulsion assembly 316, 318. This feedback is processed by monitoring module 310 that can supply correction data and other information to command module 308 and/or controllers 314. Sensors 312 such as positioning sensors, attitude sensors, speed sensors, torque sensors, environmental sensors, fuel sensors, battery level sensors, temperature sensors, gimballing angle sensors, location sensors and the like also provide information to flight control system 306 to further enhance autonomous control capabilities.

Some or all of the autonomous control capability of flight control system 306 can be augmented or supplanted by remote flight control system 304. Remote system 304 may include one or computing systems that may be implemented on general purpose computers, special purpose computers or other machines with memory and processing capability. For example, the computing systems may include one or more memory storage modules including, but not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine executable instructions. In addition, the computing systems may be connected to other computer systems via a proprietary encrypted network, a public encrypted network, the Internet or other suitable communication network that may include both wired and wireless connections. Remote system 304 communicates with flight control system 306 via a communication link 328 that may include both wired and wireless connections.

Remote system 304 preferably includes one or more flight data display devices 330 configured to display information relating to one or more aerial vehicles of the present disclosure. Display device 330 may be configured in any suitable form, including, for example, liquid crystal displays, light-emitting diode displays, cathode ray tube displays or any suitable type of display. Remote system 304 may also include audio output and input devices such as a microphone, speakers and/or audio port allowing an operator to communicate with, for example, other personnel involved with the operation of the unmanned aerial system. Display device 330 may also serve as a remote input device 332 if a touchscreen display implementation is used, however, other remote input devices, such as a keyboard or joysticks, may alternatively be used to allow an operator to provide control commands to the unmanned aerial system being operated responsive to remote control. While control system 300 is intended for an unmanned aerial system, in some embodiments control system 300 may include a pilot system (not shown) that allows a pilot onboard the aircraft to interact with remote system 304 and/or autonomous system 302 to pilot the aircraft. As should be apparent to those having ordinary skill in the art, through the use of control system 300, an unmanned aerial system of the present disclosure can be operated responsive to a flight control protocol including autonomous flight control, remote flight control and combinations thereof.

Figure 5A:
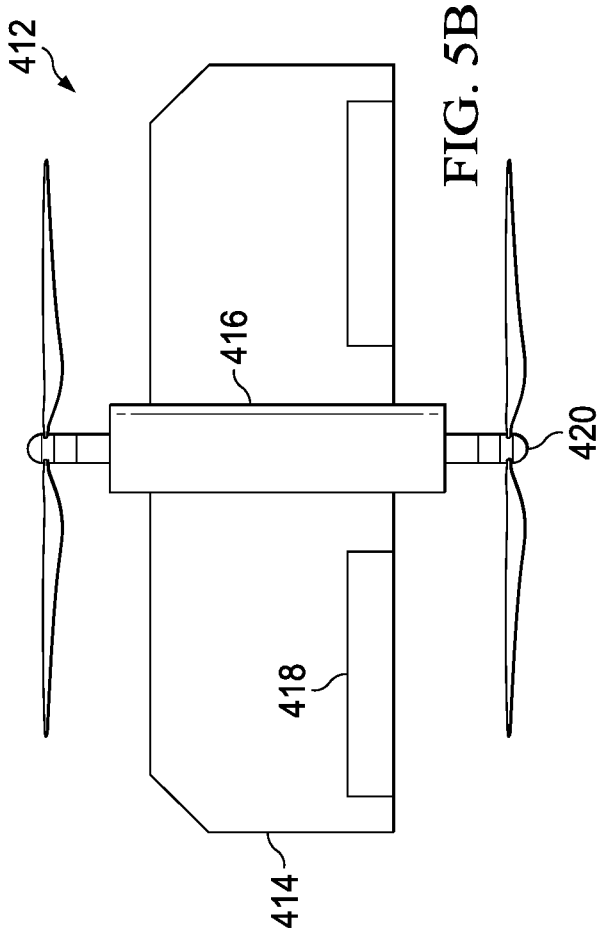
FIGS. 5A-5H are various views of different types of unmanned aerial systems having out of phase gimballing axes in accordance with embodiments of the present disclosure.
Figure 5B:
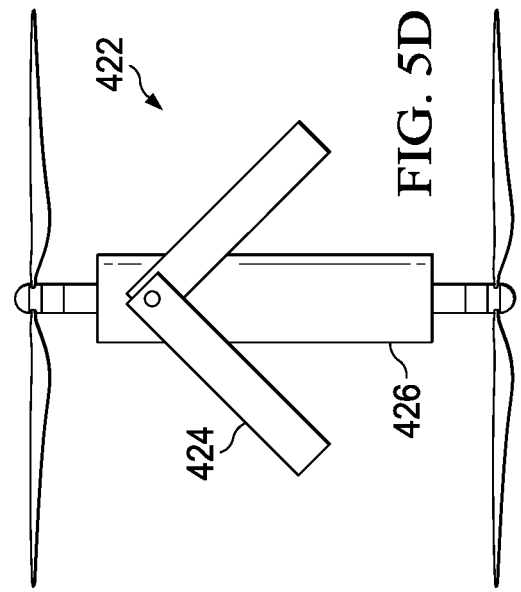

Referring to FIGS. 5A-5H in the drawings, various embodiments of an unmanned aerial system having different wing or fin configurations are depicted. In FIG. 5A, unmanned aerial system 400 includes wings 402 extending radially from fuselage 404. Wings 402 may have an airfoil shape and/or provide roll stability when unmanned aerial system 400 is in forward flight mode. Wings 402 have a swept back forward edge. In some embodiments, cargo may be stored on or inside wings 402 to provide unmanned aerial system 400 with cargo transport capabilities. Forward rotor hub assembly 406 has longer rotor blades than aft rotor hub assembly 408. In other embodiments, aft rotor hub assembly 408 may have longer rotor blades than forward rotor hub assembly 406. Unmanned aerial system 400 also includes surface stands 410 to support unmanned aerial system 400 in a vertical position prior to takeoff or after landing. As shown in FIG. 5B, unmanned aerial system 412 has larger wings 414 than wings 402 of unmanned aerial system 400. Wings 414 have lateral forward edges that are orthogonal to fuselage 416. Wings 414 also include control surfaces 418 to control the pitch of unmanned aerial system 412. In some embodiments, the same actuator that gimbals aft rotor hub assembly 420 may be used to move control surfaces 418.

Figure 5C:
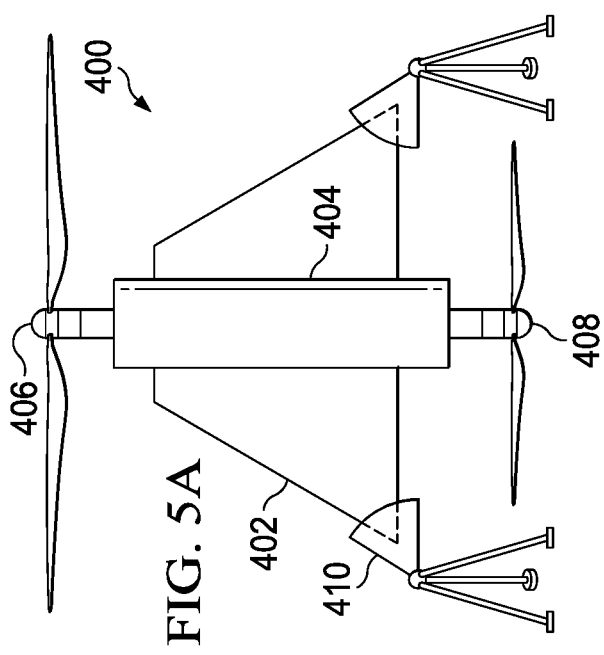
Figure 5D:
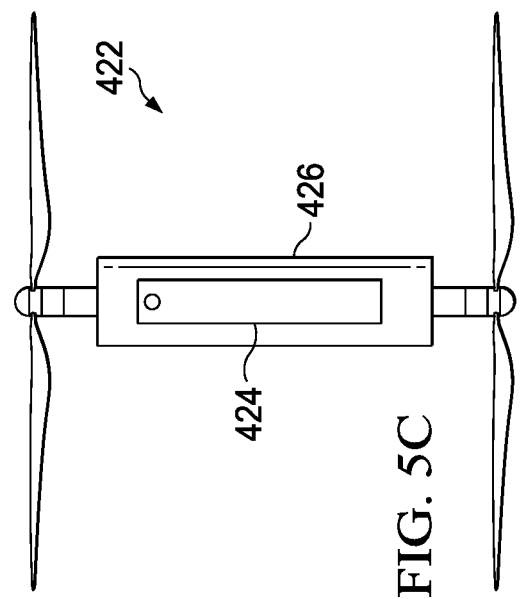

In FIGS. 5C and 5D, unmanned aerial system 422 includes retractable wings 424. In FIG. 5C, retractable wings 424 are retracted toward fuselage 426 in a storage mode. In the storage mode, the rotor blades of unmanned aerial system 422 may be folded toward fuselage 426 as described in FIG. 3A. In FIG. 5D, retractable wings 424 are pivotably expanded outward from fuselage 426 about a hinge and have a swept back configuration. In other embodiments, retractable wings 424 may expand into swept forward or straight wing configurations.

Figure 5E:
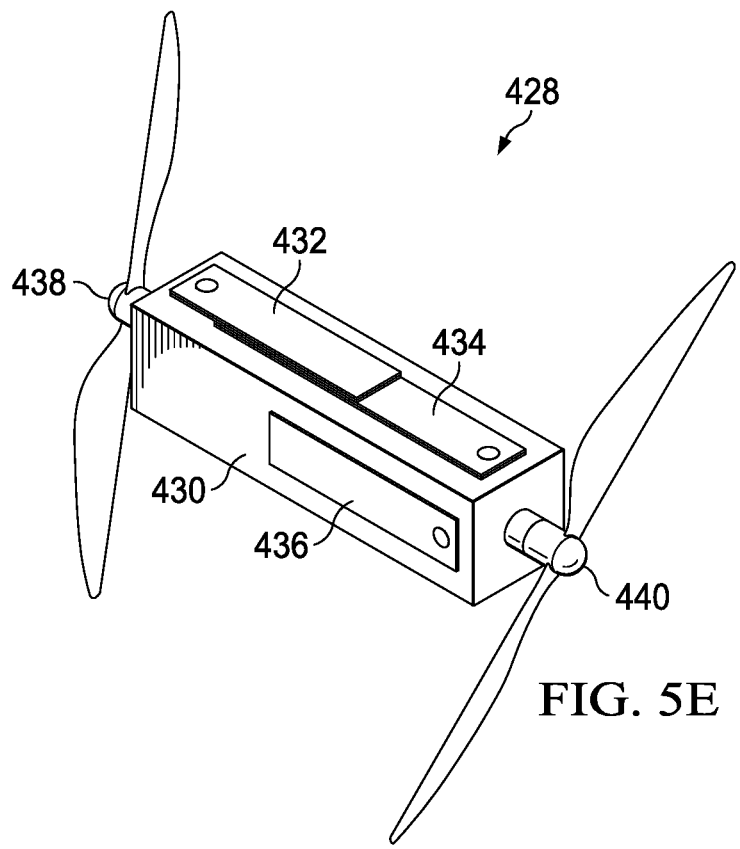
Figure 5F:
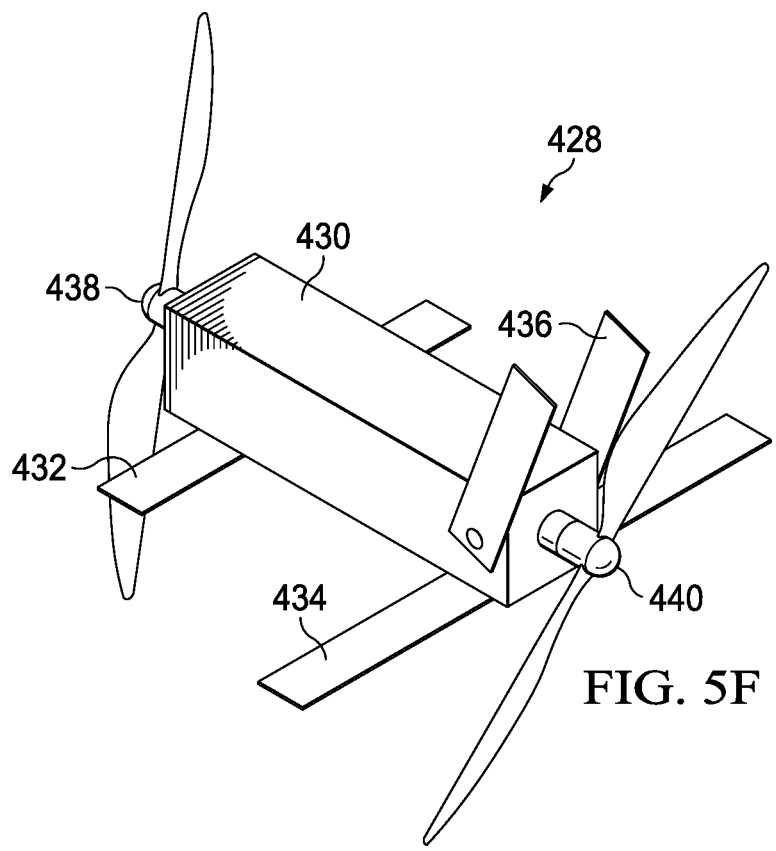

In FIGS. 5E and 5F, unmanned aerial system 428 has a cuboid fuselage 430. Unmanned aerial system 428 also includes forward retractable wings 432, aft retractable wings 434 and retractable vertical fins 436. In FIG. 5E, the underside of unmanned aerial system 428 is illustrated to show forward retractable wings 432, aft retractable wings 434 and retractable vertical fins 436 retracted toward fuselage 430 in a storage mode. Forward retractable wings 432, aft retractable wings 434 and retractable vertical fins 436 are each pivotable about respective hinges relative to fuselage 430. In FIG. 5F, the top side of unmanned aerial system 428 is illustrated to show forward retractable wings 432 and aft retractable wings 434 expanded away from fuselage 430 in a straight wing configuration. Retractable vertical fins 436 are extended upward to provide additional stability for unmanned aerial system 428. Forward retractable wings 432 and aft retractable wings 434 may have an airfoil shape to provide lift for unmanned aerial system 428. In some embodiments, forward retractable wings 432, aft retractable wings 434 and retractable vertical fins 436 may transition from the storage mode shown in FIG. 5E to the expanded mode shown in FIG. 5F after being tossed or launched into the air.

Figure 5G:
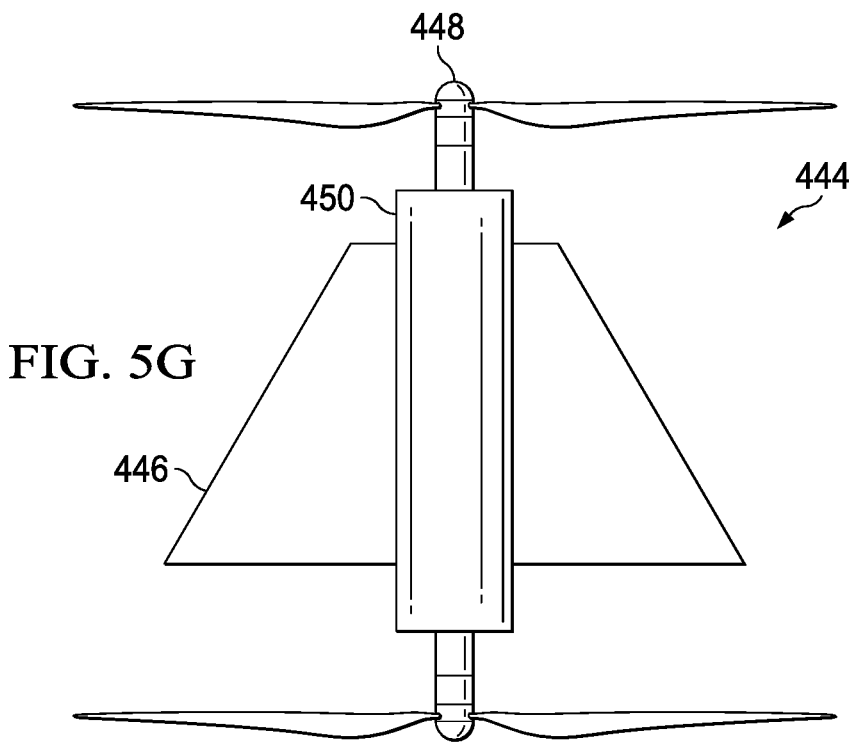
Figure 5H:
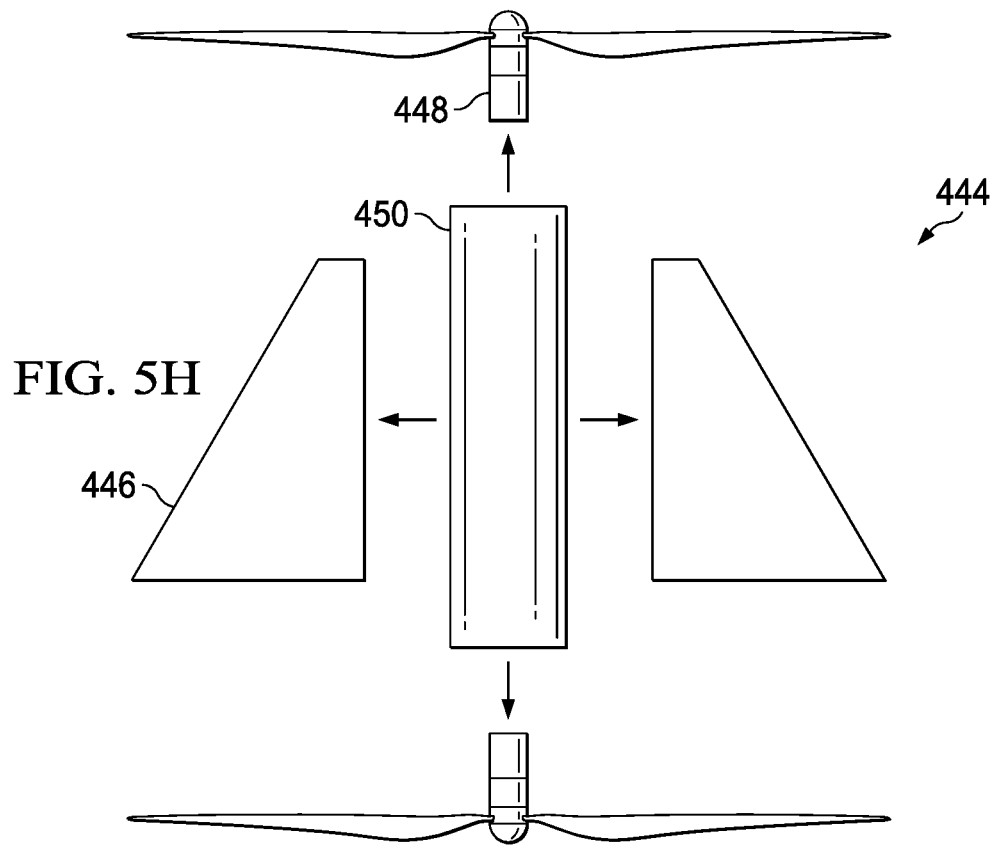

In FIGS. 5G and 5H, unmanned aerial system 444 includes detachable wings 446 and detachable rotor hub assemblies 448. Wings 446 and rotor hub assemblies 448 may be detached from fuselage 450 in a storage mode as shown in FIG. 5H. Detaching wings 446 and rotor hub assemblies 448 from fuselage 450 allows for convenient storage of unmanned aerial system 444 in a case, backpack, munitions dispenser or other storage area. Wings 446 and rotor hub assemblies 448 may be reattached to fuselage 450 as shown in FIG. 5G prior to operating unmanned aerial system 444 for any purpose.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An unmanned aerial system comprising:
   an elongated fuselage having forward and aft ends and first and second rotational degrees of freedom;
   a forward propulsion assembly disposed at the forward end of the fuselage, the forward propulsion assembly including a forward rotor hub assembly rotatably coupled to the fuselage and reversibly tiltable about a first gimballing axis to provide a first moment on the fuselage in the first rotational degree of freedom; and
   an aft propulsion assembly disposed at the aft end of the fuselage, the aft propulsion assembly including an aft rotor hub assembly rotatably coupled to the fuselage and reversibly tiltable about a second gimballing axis to provide a second moment on the fuselage in the second rotational degree of freedom;

wherein, the first gimballing axis is out of phase with the second gimballing axis to control an orientation of the fuselage in the first and second rotational degrees of freedom.

2. The unmanned aerial system as recited in claim 1 wherein the unmanned aerial system is operable to transition between a vertical takeoff and landing flight mode and a forward flight mode, the fuselage having a substantially vertical orientation in the vertical takeoff and landing flight mode and a substantially horizontal orientation in the forward flight mode.

3. The unmanned aerial system as recited in claim 2 wherein in the vertical takeoff and landing flight mode the first rotational degree of freedom further comprises one of a pitch or a roll rotational degree of freedom and the second rotational degree of freedom further comprises the other of the pitch or the roll rotational degree of freedom.

4. The unmanned aerial system as recited in claim 2 wherein in the vertical takeoff and landing flight mode differential torque between the forward and aft rotor hub assemblies provides a third moment on the fuselage in a yaw rotational degree of freedom.

5. The unmanned aerial system as recited in claim 2 wherein in the forward flight mode the first rotational degree of freedom further comprises one of a pitch or a yaw rotational degree of freedom and the second rotational degree of freedom further comprises the other of the pitch or the yaw rotational degree of freedom.

6. The unmanned aerial system as recited in claim 2 wherein in the forward flight mode differential torque between the forward and aft rotor hub assemblies provides a third moment on the fuselage in a roll rotational degree of freedom.

7. The unmanned aerial system as recited in claim 1 wherein the fuselage further comprises a substantially cylindrical fuselage.

8. The unmanned aerial system as recited in claim 1 wherein the fuselage further comprises a polygonal cross sectional shape.

9. The unmanned aerial system as recited in claim 1 wherein the forward propulsion assembly further comprises an actuator operable to rotate the forward rotor hub assembly about the first gimballing axis and the aft propulsion assembly further comprises an actuator operable to rotate the aft rotor hub assembly about the second gimballing axis.

10. The unmanned aerial system as recited in claim 1 wherein differential torque between the forward and aft rotor hub assemblies provides a third moment on the fuselage in a third rotational degree of freedom.

11. The unmanned aerial system as recited in claim 1 wherein the forward and aft rotor hub assemblies are counter rotating.

12. The unmanned aerial system as recited in claim 1 wherein the forward and aft rotor hub assemblies are rotatable to provide thrust in the same direction.

13. The unmanned aerial system as recited in claim 1 wherein the forward and aft rotor hub assemblies further comprise variable speed forward and aft rotor hub assemblies.

14. The unmanned aerial system as recited in claim 1 wherein the forward and aft rotor hub assemblies further comprise fixed pitch rotor blades.

15. The unmanned aerial system as recited in claim 1 wherein the forward and aft rotor hub assemblies further comprise foldable rotor blades folded toward the fuselage in a storage mode.

16. The unmanned aerial system as recited in claim 1 wherein the forward and aft rotor hub assemblies rotate about a common axis when the forward and aft rotor hub assemblies are in a nongimballed position.

17. The unmanned aerial system as recited in claim 1 wherein the first gimballing axis is orthogonal to the second gimballing axis.

18. The unmanned aerial system as recited in claim 1 further comprising a power system including a battery housed in the fuselage.

19. The unmanned aerial system as recited in claim 1 further comprising one or more wings extending radially from the fuselage.

20. A rotorcraft comprising:
an elongated fuselage having forward and aft ends and first and second rotational degrees of freedom, the fuselage having a substantially vertical orientation in a vertical takeoff and landing flight mode and a substantially horizontal orientation in a forward flight mode;
a forward propulsion assembly disposed at the forward end of the fuselage, the forward propulsion assembly including a forward rotor hub assembly rotatably coupled to the fuselage and reversibly tiltable about a first gimballing axis to provide a first moment on the fuselage in the first rotational degree of freedom; and
an aft propulsion assembly disposed at the aft end of the fuselage, the aft propulsion assembly including an aft rotor hub assembly rotatably coupled to the fuselage and reversibly tiltable about a second gimballing axis to provide a second moment on the fuselage in the second rotational degree of freedom;
wherein, the first gimballing axis is orthogonal to the second gimballing axis to control an orientation of the fuselage in the first and second rotational degrees of freedom;
wherein, in the vertical takeoff and landing flight mode, the first rotational degree of freedom is one of a pitch or a roll rotational degree of freedom and the second rotational degree of freedom is the other of the pitch or the roll rotational degree of freedom; and
wherein, in the forward flight mode, the first rotational degree of freedom is one of the pitch or a yaw rotational degree of freedom and the second rotational degree of freedom is the other of the pitch or the yaw rotational degree of freedom.

\* \* \* \* \*